United States Patent [19]

Zangenfeind et al.

[11] Patent Number: 4,732,278

[45] Date of Patent: Mar. 22, 1988

[54] APPARATUS FOR TRANSPORTING CARTRIDGE FOR EXPOSED ROLL FILM

[75] Inventors: Helmut Zangenfeind, Puchheim; Günther Dömges, Deisenhofen; Reinhart Würfel, Munich, all of Fed. Rep. of Germany

[73] Assignee: Agfa Gevaert Aktiengesellschaft, Leverkusen, Fed. Rep. of Germany

[21] Appl. No.: 778,612

[22] Filed: Sep. 20, 1985

[30] Foreign Application Priority Data

Oct. 9, 1984 [DE] Fed. Rep. of Germany ....... 3437046

[51] Int. Cl.[4] ............................................ B65G 11/20

[52] U.S. Cl. ...................................... 209/546; 193/47; 198/406; 198/463.6; 198/532; 221/290

[58] Field of Search ............... 209/540, 544, 583, 549, 209/702, 703, 911, 546; 414/403, 412, 417; 193/44–48; 221/156, 172, 290; 354/312, 313; 198/406, 532, 463.6

[56] References Cited

U.S. PATENT DOCUMENTS

| | | | |
|---|---|---|---|
| 635,588 | 10/1899 | Pondorf | 221/172 |
| 1,555,910 | 10/1925 | Chester | 193/44 |
| 3,260,363 | 7/1966 | Vukosic | 193/44 |
| 3,402,812 | 9/1968 | Nerwin | 209/598 |
| 3,782,517 | 1/1974 | Newcomb | 193/47 |
| 3,866,744 | 2/1975 | Klose | 193/44 |
| 4,076,135 | 2/1978 | Klose | 414/403 |
| 4,094,726 | 6/1978 | Hujer et al. | 354/313 |
| 4,586,803 | 5/1986 | Moss et al. | 354/313 |

FOREIGN PATENT DOCUMENTS

| | | | |
|---|---|---|---|
| 3010271 | 9/1981 | Fed. Rep. of Germany | 193/46 |
| 2335453 | 12/1982 | Fed. Rep. of Germany | . |

OTHER PUBLICATIONS

Publication (sale brochure) entitled "Agfa APS 135 Auto Presplicer", no date.

*Primary Examiner*—David A. Scherbel
*Assistant Examiner*—Donald T. Hajec
*Attorney, Agent, or Firm*—Peter K. Kontler

[57] ABSTRACT

An apparatus for transporting cartridges for exposed photographic roll films to an opening station has a downwardly sloping duct whose inlet can receive the shells of successive cartridges only in a predetermined orientation. The lower end of an inserted container or cartridge comes to rest on a first gate and the gate is retracted from the duct so as to permit gravitational descent of the inserted cartridge only if the orientation of the inserted cartridge is proper. The cartridge which descends below the retracted first gate impinges upon a cylindrical bolt which tilts the cartridge approximately 90 degrees so that the axis of the shell of such tilted cartridge is substantially horizontal before the cartridge descends onto a second retractible gate and thereupon onto a third gate in the bottom of the duct. The inclination of the duct with reference to a horizontal plane is at least 45 degrees. The cartridge which reaches the bottom of the duct is in optimum position for expulsion of the reel of a convoluted exposed photographic roll film thereon from the shell and into the range of an unwinding mechanism.

29 Claims, 4 Drawing Figures

FIG.3
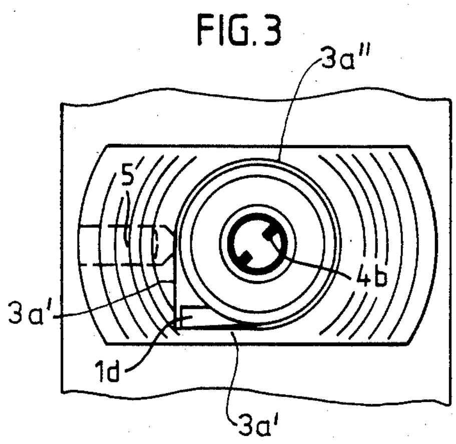
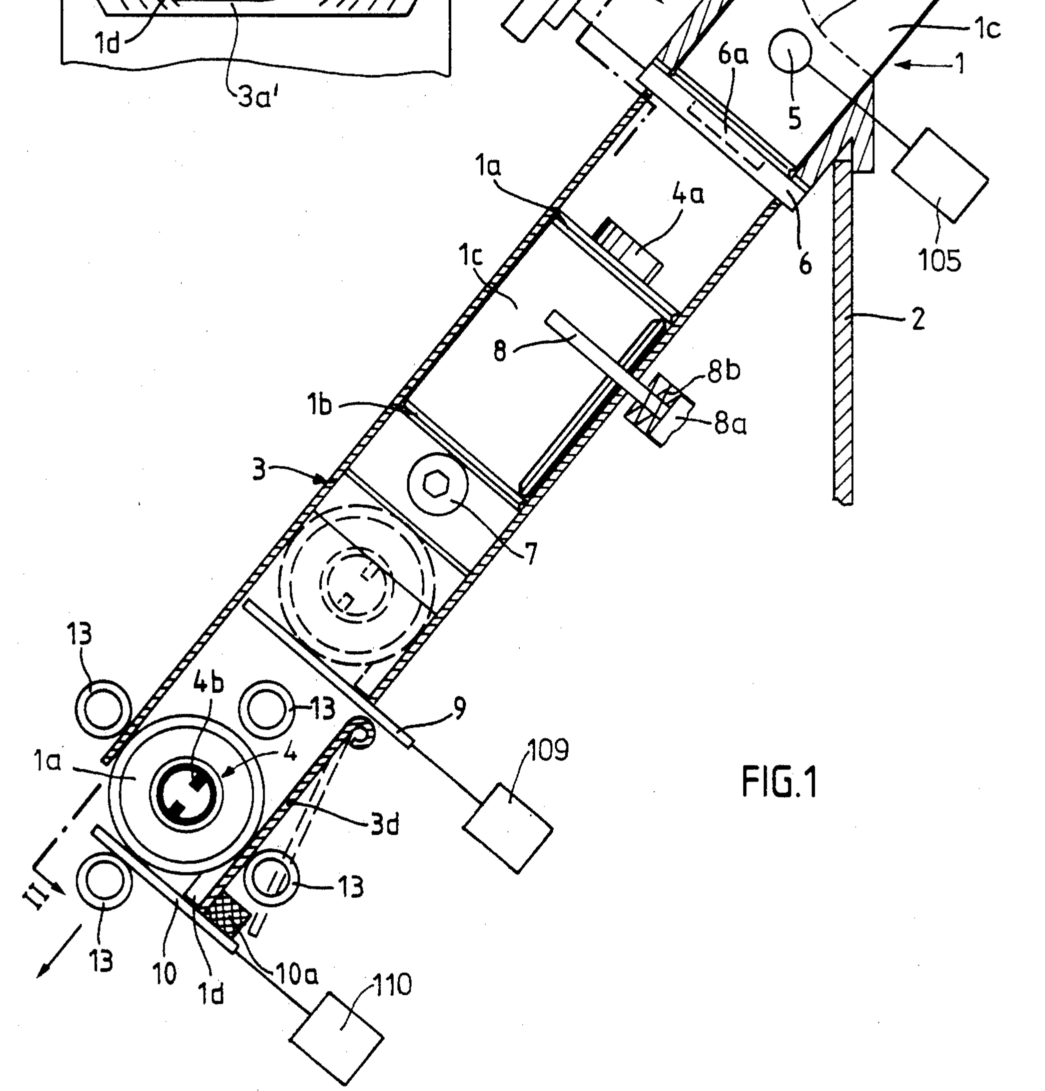
FIG.1

APPARATUS FOR TRANSPORTING CARTRIDGE FOR EXPOSED ROLL FILM

CROSS-REFERENCE TO RELATED CASES

The apparatus of the present invention is in part identical with apparatus which are disclosed in commonly owned copending patent applications Ser. Nos. 778,609 and 778,611, both filed Sept. 20, 1985. Application Ser. No. 778,609 issued Nov. 11, 1986 as U.S. Pat. No. 4,621,970.

BACKGROUND OF THE INVENTION

The present invention relates to improvements in apparatus for transporting successive containers for exposed photographic roll films. More particularly, the invention relates to improvements in apparatus for transporting containers for photographic roll films of the type wherein the films are convoluted on the cores of cylindrical reels having pairs of flanges which flank the convoluted films and are confined in cylindrical shells whose end portions carry end walls and which are provided with axially parallel mouths through which the films can be moved while the containers are confined in the housings of photographic apparatus. Still more particularly, the invention relates to apparatus for transporting cartridges or analogous containers for exposed photographic roll films to an opening station where the rolls of exposed photographic film and the respective reels are expelled from their shells preparatory to unwinding of the films from the respective cores.

German Pat. No. 23 35 453 discloses an apparatus wherein the mouth of the shell of a cartridge containing exposed photographic film is slipped onto a gripper consisting of resilient sheet metal and the gripper is thereupon pivoted into the interior of the apparatus wherein the reel is withdrawn from the respective cartridge. Such mounting of the cartridge prior to introduction into the apparatus ensures that the mouth is invariably held in a predetermined orientation with respect to the reel-removing instrumentalities. However, such apparatus also exhibit a number of serious drawbacks. First of all, the apparatus can process a relatively small number of cartridges per unit of time. Secondly, a cartridge can be inserted onto the gripper in improper orientation (at an angle of 180° with respect to the proper orientation), and the film is likely to be damaged if the reel-expelling operation is not carried out in a prescribed way.

OBJECTS AND SUMMARY OF THE INVENTION

An object of the invention is to provide a novel and improved apparatus which can transport to an opening station a series of successive containers for exposed photographic roll films in such a way that each container invariably reaches the opening station in an optimum orientation and in an optimum angular position with reference to the opening instrumentalities.

Another object of the invention is to provide an apparatus which can process a large number of film containers per unit of time.

A further object of the invention is to provide an apparatus which can process a large number of film containers per unit of time without in any way affecting the integrity of the confined exposed photographic roll films.

Still another object of the invention is to provide an apparatus which can be utilized in existing production lines to process exposed photographic roll films for the purpose of making prints of selected film frames.

A further object of the invention is to provide the apparatus with novel and improved means for feeding successive film containers to a container opening station.

A further object of the invention is to provide a novel and improved method of manipulating successive film containers during transport to an opening station where the reels with exposed photographic roll films thereon are expelled from the corresponding containers.

Another object of the invention is to provide an apparatus wherein the containers are automatically advanced from station to station and wherein an improperly inserted container cannot advance to the next station unless its orientation or angular position is changed so as to conform to the prescribed orientation and/or angular position.

An additional object of the invention is to provide an apparatus which occupies a small amount of space, whose operation can be entrusted to inexperienced or semiskilled operators, and which automatically prevents improper transport of containers to the opening station so that the opening station invariably receives containers in proper positions for automatic expulsion of reels with exposed photographic films thereon.

The invention is embodied in an apparatus for transporting to an opening station a series of successive containers (e.g., cartridges) for exposed photographic roll films of the type wherein a substantially cylindrical shell has a substantially tangentially extending mouth and the end portions of the shell are in sealing engagement with apertured end walls which afford access to the respective end portions of a core forming part of a reel which is confined in the interior of the shell and has a pair of spaced-apart flanges flanking a roll of convoluted exposed photographic film. The apparatus comprises a downwardly sloping duct having an upper end portion provided with an inlet for admission of successive containers, means for permitting the introduction of successive containers in a predetermined angular position of the respective shells, and means for tilting successive containers in the duct ahead of the opening station. The apparatus further comprises at least one gate which is provided in the duct and means for moving the gate between an operative position in the interior of the duct and a retracted position outside of the duct. The gate is provided between the inlet and the opening station which latter is preferably located at a level below the inlet. The duct defines a downwardly inclined path which makes an angle of at least 45° with the horizontal. Such angle is preferably between 50 and 80 degrees, and most preferably in the region of 55 degrees.

The tilting means preferably includes means for changing the orientation of the shells of successive containers through an angle of approximately 90 degrees at a level below the one gate.

The apparatus preferably further comprises a housing including a substantially upright wall which supports the duct in the region of the inlet. The inlet is preferably provided with laterally diverging funnel-shaped portions which serve to allow for extraction of an improperly inserted container from the inlet. The means for permitting introduction of containers in a predetermined orientation of the respective shells preferably includes at least one facet which is provided in the inlet and is engageable by the mouth of a properly inserted shell. The duct preferably includes a substantially cylindrical internal surface which surrounds the inlet along an arc of approximately 270 degrees.

The containers are preferably of the type wherein the shell has information encoded at the exterior thereof and denoting the type of film in the respective container. The apparatus preferably further comprises means for monitoring the information of the shells of containers in the inlet and for actuating the means for moving the one gate in response to detection of information denoting a selected type of film in the respective container, namely a type of film which is compatible with other films that are being processed in the apparatus.

As a rule, one end portion of the core of the reel in a container which is processed in the apparatus of the present invention extends beyond the respective end wall, and the gate is preferably spaced apart from the inlet of the duct by a distance which approximates half the axial length of a container. Such gate has a portion which is to be engaged by the one end portion of the core of the shell in a container which is inserted into the inlet, and the means for moving the one gate is preferably arranged to move the gate out of the duct only when the aforementioned portion of the gate is not engaged by the one end portion of a core. In other words, the moving means is capable of extracting the one gate from the interior of the duct only when the aforementioned portion of the one gate is not engaged by the one end portion of the core of the shell of that container which is inserted into the inlet of the duct. Such portion of the one gate can be provided with a recess which receives the one end portion of the core of an improperly inserted container. The apparatus can further comprise means for generating signals in response to actuation of the moving means while the aforementioned portion of the gate is engaged by the one end portion of a core.

The duct is preferably provided with a polygonal portion which is disposed at a level below the one gate, and the tilting means is preferably disposed in the duct at a level at least 1.2 times the length of a container below the one gate. Such tilting means preferably comprises an element which is eccentric with reference to the axis of a container descending by gravity from the level of the gate into the polygonal portion of the duct. For example, the tilting element can include a substantially cylindrical member in the form of a bolt or stud, and the width of the polygonal portion of the duct at the level of the cylindrical member preferably exceeds the axial length of a container. The duct preferably further comprises a second portion which is disposed at a level below the tilting element and is laterally offset with reference to the polygonal portion by approximately half the diameter of a shell, as considered in the direction of tilting of containers under the action of the tilting element. Such apparatus preferably further comprises a second retractible gate which is provided in the duct at a level below the tilting means, and the distance between the levels of the tilting means and the second gate at least matches the diameter of a shell. The second gate is preferably located in a plane which is inclined with respect to a horizontal plane.

The apparatus preferably further comprises means for determining the timing of tilting of successive containers by the tilting means. Such timing determining means can comprise a barrier which is installed in the duct at a level above the tilting means and is adjacent to the path of movement of containers from the inlet against the tilting means. The apparatus further comprises means for moving the barrier into and from the duct with a predetermined delay following impingement of a container upon the tilting means.

The internal surface of the duct preferably consists of a corrosion-resistant material. For example, the internal surface of the duct can be coated with a wear-resistant material such as a lacquer.

The lower end portion of the duct preferably includes a wall which is pivotable through an angle of at least 15 degrees and an additional retractible gate which is adjacent to the pivotable wall. The pivotable wall is preferably pivotable at its upper end about a substantially horizontal axis.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a vertical sectional view of an apparatus which embodies one form of the present invention;

FIG. 3 is a front elevational view of the inlet of the duct as seen in the direction of arrow III in FIG. 1.

DESCRIPTION OF THE PREFERRED EMBODIMENTS

Figures 2, 4:
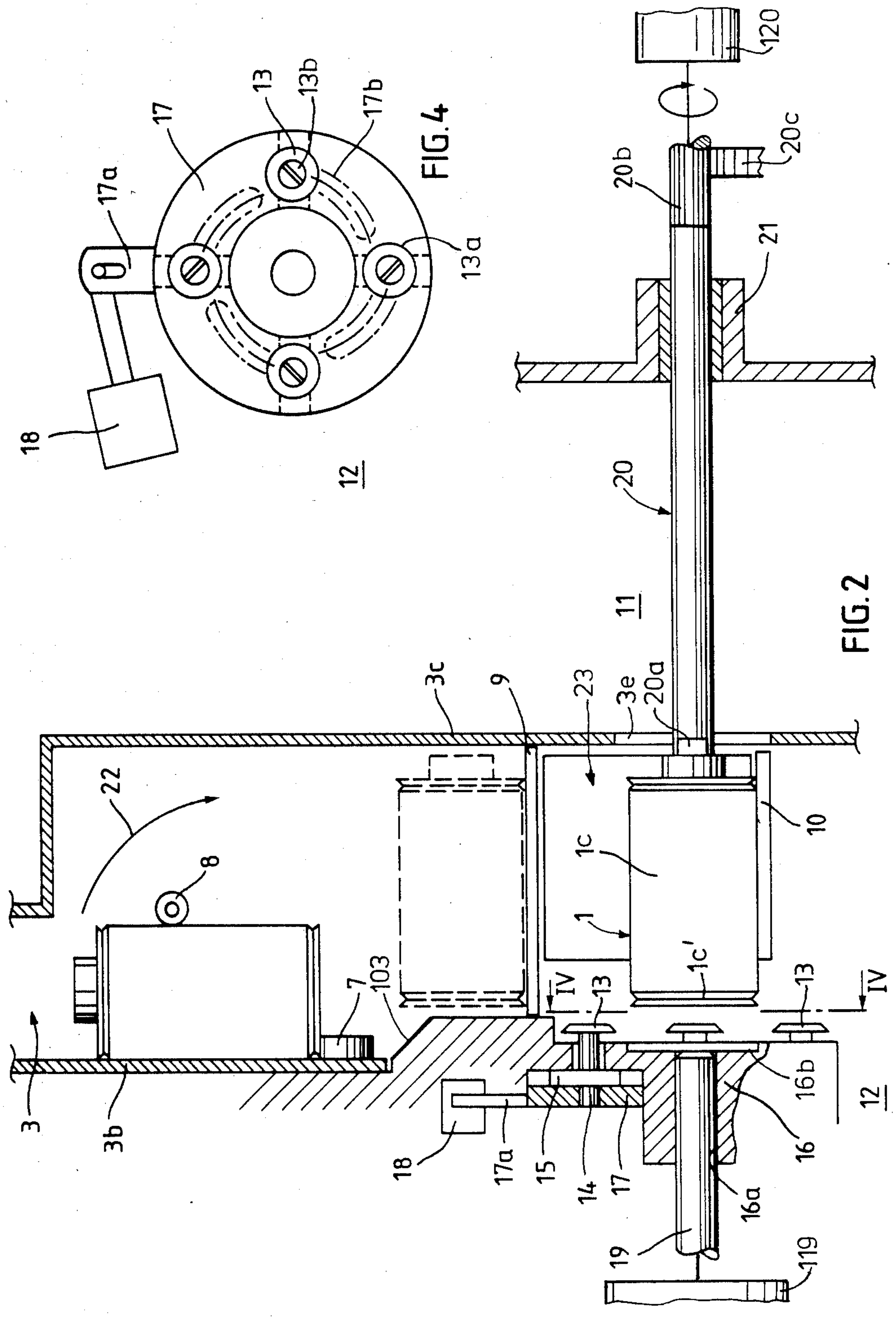
FIG. 2 is a sectional view as seen in the direction of arrows from the line II—II of FIG. 1.
FIG. 4 is a vertical sectional view as seen in the direction of arrows from the line IV—IV of FIG. 2.

FIG. 1 shows an elongated downwardly sloping duct 3 which constitutes a means for supplying a succession of film containers or cartridges 1 to an opening station 23 at the lower end of the duct. Each cartridge 1 comprises a substantially cylindrical shell 1*c* and two end walls 1*a*,1*b* which are sealingly received in the corresponding end portions of the shell. To this end, the end portions of the shell 1*c* can be provided with suitable corrugations which prevent unintentional expulsion or removal of the respective end walls. Each cartridge 1 further comprises a reel 4 with two coaxial flanges mounted on or integral with a core 4*a* one end portion of which extends beyond the respective end wall 1*a*. As shown in FIG. 3, the one end portion of the core 4*a* is hollow and has two internal ribs or webs 4*b* which are disposed diametrically opposite each other and can be engaged by the blade-like end portion 20*a* of a mandrel 20 (shown in the lower portion of FIG. 2) so that the mandrel can rotate the reel 4 in a direction to wind the exposed convoluted roll film thereon. The roll film is convoluted between the two flanges.

The upper portion of FIG. 1 illustrates a cartridge 1 in the inlet 3*a* of the duct 3. Such inlet is located in that portion of the duct 3 which is mounted in an upright wall 2 of the housing of the improved apparatus. The configuration of the surfaces bounding the inlet 3*a* is such that approximately one-half of the cartridge extends outwardly and beyond the upper end of the duct 3 and can be grasped by two fingers in order to allow for extraction of a cartridge which is improperly inserted into the duct. The lower portion of the freshly inserted cartridge 1 rests on a first gate 6 which is reciprocable between the operative or extended position of FIG. 1 and a retracted position by a moving means 106 in the form of a reciprocable armature forming part of an electromagnet or by a pneumatically or hydraulically operated motor. It is preferred to install a friction clutch 106*a* or the like between the gate 6 and the moving means 106. As can be seen in FIG. 3, the inlet 3*a* diverges laterally to both sides of the inserted cartridge 1 so as to allow for convenient engagement of two fingers with the upper portion of the inserted cartridge. FIG. 3 further shows that the passage which is defined by the duct 3 in the region of the inlet 3*a* is bounded by a cylindrical surface 3*a*" which extends along an arc of approximately 270° and by two facets 3*a* which make an angle of 90° and serve to properly orient the cartridge 1 in the inlet 3*a*. The shell 1*c* of the cartridge has a mouth 1*d* which extends in parallelism with the axis of the shell and is provided with internal sealing elements consisting of felt or the like to provide a passage for the photographic film which is convoluted onto the reel 4 in the interior of the shell 1*c*. The mouth 1*d* abuts against the facets 3*a*' on insertion of a properly oriented cartridge 1 into the inlet 3*a*.

That portion of the duct 3 which is located at a level below the gate 6 has a square, rectangular or other polygonal outline and has a width which at least equals but preferably at least slightly exceeds the axial length of a cartridge 1. This can be readily seen in the upper portion of FIG. 2.

The duct 3 supports a monitoring device 5 which can read the information that is encoded at the exterior of the shell 1*c* of each cartridge 1 and denotes the characteristics of the film which is stored in the respective cartridge. The monitoring device 5 generates a signal which actuates the moving means 106 for the gate 6 so as to extract the gate from the interior of the duct 3 when the film in the cartridge that has been inserted into the inlet 3*a* is compatible with the previously inserted films, namely when such film can be developed and further processed together with the films which were withdrawn from the previously treated cartridges. The code at the exterior of each shell 1*c* can be a conventional bar code and can denote whether or not the film is a daylight or artificial light film, color film or black-and-white film, etc. If the film in the cartridge 1 which has been inserted into the inlet 3*a* of the duct 3 is not compatible with the previously treated films, the monitoring device 5 preferably generates a visible and/or audible and/or otherwise detectable signal which informs the operator that the cartridge 1 must be withdrawn from the inlet 3*a*. The means for generating signals is schematically shown at 105.

In accordance with a presently preferred embodiment, the moving means 106 comprises a rotary electromagnet which can swing the gate 6 in its own plane between the extended or operative position of FIG. 1 and a retracted position in which the gate is located outside of the path of movement of successive cartridges 1 from the inlet 3*a* deeper into the interior of the duct 3. The upper side of the gate 6 has a centrally located recess 6*a* with a diameter slightly exceeding the diameter of the outwardly extending portion of the core 4*a*. If the cartridge 1 is improperly inserted so that the outwardly projecting portion of the core 4*a* extends into the recess 6*a* of the gate 6, the moving means 106 is incapable of extracting the gate 6 from the interior of the duct 3. At such time, the friction clutch 106*a* becomes operative to permit the rotary electromagnet of the moving means 106 to move relative to the gate 6 so that the gate prevents penetration of the improperly inserted cartridge 1 deeper into the duct 3. The operator is thereby warned to invert the cartridge 1 so that the longer end portion of the core 4*a* will extend upwardly and beyond the inlet 3*a* (as actually shown in the upper end portion of FIG. 1). The actuation of the clutch 106*a* can entail the generation of a visible and/or audible signal by a signal generator 106*b* which warns the operator that the cartridge 1 in the inlet 3*a* must be inverted. It is clear that the recess 6*a* can be replaced with a projection which penetrates into the interior of the longer end portion of the core 4*a* if the cartridge 1 is improperly inserted into the inlet 3*a*. All that counts is to ensure that the moving means 106 cannot extract the gate 6 from the interior of the duct 3 if the inclination or orientation of the freshly inserted cartridge 1 is improper. The angular position of the inserted cartridge 1 is controlled by the facets 3*a*' which are designed to confine the mouth 1*d* and prevent the insertion of a cartridge 1 in any other angular position.

The monitoring device 5 can constitute a reflection type photocell or any other device which can read the encoded information on the shells 1*c* of successive cartridges 1 and can generate appropriate signals for actuation of the moving means 106 and/or for generation of visible or audible signals via 105 to warn the operator that the cartridge 1 must be withdrawn from the inlet 3*a* to be replaced by a different cartrige.

As mentioned above, the portion of the duct below the gate 6 is enlarged and has a substantially square, rectangular or other polygonal cross-sectional outline. The depth of such portion slightly exceeds the diameter of a cartridge and such portion of the duct accommodates a tilting element 7 which is a short cylindrical bolt or pin preferably located at a level approximately one and a half lengths of a cartridge below the level of the gate 6. The tilting element 7 is mounted eccentrically with respect to the axis of the cartridge 1 which descends beyond the level of the gate 6 when the latter is extracted by the moving means 106. Immediate tilting of the cartridge 1 which descends onto the tilting element 7 is prevented by a retractible barrier 8 which is biased out of the interior of the duct 3 by a coil spring 8*b* and can be held in the extended position of FIG. 1 by a motor 8*a*, e.g., a pneumatic or hydraulic cylinder and piston unit. The barrier 8 is preferably retracted with a certain delay following retraction of the gate 6 from the interior of the duct 3 so as to ensure that the cartridge 1 which has descended onto the tilting element 7 has time to rebound once or more than once before it begins to change its orientation by turning about an axis which is adjacent to the sidewall 3*b* of the duct 3 (see FIG. 2) in the direction which is indicated by the arrow 22. The diameter of the tilting element 7 can approximate one-third of the diameter of a cartridge 1 and the axial length of such tilting element can equal or approximate one-fifth of the diameter of a cartridge.

The barrier 8 is preferably located at a level slightly more than half the length of a cartridge above the level of the tilting element 7. The motor 8*a* can constitute a reciprocable electromagnet or any other suitable means for moving the barrier 8 against the opposition of the coil spring 8b. If the motor 8a is an electromagnet, energization of the electromagnet automatically entails a return movement of the barrier 8 out of the interior of the duct 3 under the action of the coil spring 8b so that the cartridge 1 which already rests on the tilting element 7 can turn in the direction of the arrow 22 so that its shell 1c assumes a substantially horizontal position as indicated in FIG. 2 by broken lines. The width of the duct 3 at a level above and at the level of the tilting element 7 preferably slightly exceeds the length of a cartridge 1. Such width can approximate 1.2 lengths of a cartridge. The duct portion immediately below the tilting element 7 is offset in a direction to the right, as viewed in FIG. 2, so as to ensure that the tilted cartridge 1 assumes a predetermined position on a second extractible gate 9 which is preferably inclined with reference to a horizontal plane (see FIG. 1) and can be moved into and out of the duct 3 by a moving means 109 in the form of an electromagnet, a pneumatic motor or the like. The moving means 109 can receive signals in response to extraction of the barrier 8 so that it opens the gate 9 with a delay which is necessary to ensure that a tilted cartridge 1 can descend from the level of the tilting element 7 onto the gate 9 and comes to rest on the gate 9 before the latter is extracted from the corresponding portion of the duct 3. The distance between the levels of the tilting element 7 and the gate 9 preferably equals or slightly exceeds the diameter of a shell 1c. The offset portion of the sidewall 3b which is disposed immediately below the tilting element 7 defines a ramp 103 which ensures that the tilted cartridge 1 moves close to the respective side of an upright partition 3c forming part of the duct 3. The moving means 109 is preferably arranged to pull the gate 9 in a direction toward the respective side of the upright wall 2 of the housing of the improved apparatus.

The lowermost portion of the duct 3 is defined by a third reciprocable gate 10, which is movable between extended and retracted positions by a moving means 110, and by a pivotable wall or flap 3d the upper end portion of which can turn about a horizontal axis defined by the housing of the apparatus and the lower end portion of which can be moved from the broken-line position to the solid-line position of FIG. 1 by an upward projection or sealing element 10a of the gate 10. When the gate 10 is retracted in a direction to the right, as viewed in FIG. 1, and the flap 3d is pivoted to the broken line position, the empty shell 1c and the end wall 1b of a cartridge 1 can descend by gravity into a suitable collecting receptacle, not shown in the drawing. A cartridge 1 which comes to rest on the gate 10 is located at the opening station 23, and the core 4a of the reel 4 in such cartridge is in axial alignment with a reciprocable pusher 19 and with the reciprocable mandrel 20.

The apparatus further comprises a holder 12 which includes preferably four equidistant grippers 13 in the form of idler rollers having sharp circumferentially extending edges 13a and serving to engage the external surface of the shell 1c in the region of the end wall 1b so as to positively hold the shell against axial movement in a direction from the opening station 23 toward an unwinding station 11 which is shown in the lower part of FIG. 2. Such movement of the reel 4 and its core 4a is effected in response to movement of the pusher 19 in a direction to the right, as viewed in FIG. 2, under the action of a relatively large and strong fluid-operated (e.g., pneumatic) motor 119 which can overcome the resistance of a motor 120 serving to move the mandrel 20 in a bearing 21 axially in a direction to the left, as viewed in FIG. 2. The grippers 13 of the holder 12 can be moved between retracted positions which are shown in FIG. 2 and extended positions in which their innermost portions engage the external surface of the adjacent end portion of the shell 1c at the opening station 23. The grippers 13 are mounted on supports 15 which have followers 14 extending into arcuate cam grooves 17b of a ring-shaped cam 17 having a radially outwardly projecting extension 17a which can be rocked by an electromagnet 18 so as to move the grippers 13 toward or away from engagement with the adjacent end portion of the shell 1c at the opening station 23. The cam 17 surrounds a stationary stop 16 which has an axial bore 16a for the pusher 19 and which further defines a recess or socket 16b for the adjacent end portion of the shell 1c at the station 23. The shell 1c which has penetrated into the socket 16b is properly centered with respect to the pusher 19 and mandrel 20. The arrangement is such that, when a cartridge 1 descends onto the gate 10, the motor 120 is started to move the mandrel 20 in a direction to the left, as viewed in FIG. 2, whereby the end portion 20a of the mandrel 20 engages the ribs 4b in the interior of the adjacent end portion of the core 4a and begins to rotate the reel 4 in the cartridge in a direction to wind the film onto the core 4a between the respective flanges. At such time, the grippers 13 of the holder 12 are held in their retracted positions. The mandrel 20 is moved axially to introduce the left-hand end portion of the shell 1c into the socket 16b whereupon the electromagnet 18 is actuated to turn the ring cam 17 in a direction to move the sharp edge portions 13a of the grippers 13 into engagement with the adjacent end portion of the shell 1c so that the latter is positively held against axial movement with or relative to the respective reel 4. In the next step, the pusher 19 is caused to move in a direction to the right, as viewed in FIG. 2, and to expel the reel 4 from the shell 1c (while the latter is being held by the grippers 13) whereby the reel 4 expels the right-hand end wall 1a from the corresponding end portion of the shell and causes such end wall and the film thereon to move from the opening station 23 through a circular opening 3e of the partition 3c and to the unwinding station 11. The manner in which the film is withdrawn from the reel 4 at the unwinding station 11 is disclosed in the commonly owned copending patent application Ser. No. 778,611.

Each of the grippers 13 can be mounted for rotation relative to its support 15. Alternatively, each of the grippers 13 can be held in a selected angular position by a screw 13b or by other suitable fastener means and its angular position can be changed from time to time so as to place the sharp edges 13a of such grippers into optimum positions for engagement with successive shells 1c at the opening station 23. The inclination of the cam grooves 17b in the rotary cam 17 is such that, when the cam 17 is rotated by the electromagnet 18, each of the grippers 13 has a component of movement in the radial direction of the mandrel 20 as well as in a direction tangentially of such mandrel.

The diameter of the circular opening 3e in the partition 3c of the duct 3 equals or slightly exceeds the diameter of a reel 4. The opening 3e is bounded by a circular internal surface of the partition 3c and such surface prevents unwinding of film from the reel 4 while the reel is being transferred from the opening station 23 to the unwinding station 11.

The mandrel 20 can be rotated by a driven gear 20*c* which meshes with a pinion 20*b* of the mandrel. The axial length of the pinion 20*b* is such that it remains in mesh with the gear 20*c* in each and every axial position of the mandrel 20. The gear 20*c* drives the mandrel 20 in a direction to wind the film onto the reel 4 during transfer of such reel from the opening station 23 to the unwinding station 11.

As mentioned before, the mandrel 20 not only serves to rotate the reel 4 in a cartridge 1 at the opening station 23 in a direction to wind the film onto the reel but also serves as a means for shifting such cartridge axially in a direction toward and into the socket 16*b* of the stop 16 so as to make sure that the corresponding end portion of the shell 1*c* can be properly engaged by the grippers 13 of the holder 12 before the pusher 19 is caused to perform a forward stroke and to transfer the corresponding reel 4 and the roll film thereon from the station 23 to the station 11. At such time, the pusher 19 moves the mandrel 20 against the opposition of the respective motor 120 which can be much weaker than the motor 119 for the pusher. As the mandrel 20 rotates, it causes the outermost convolution of the roll of film to engage the internal surface of the shell 1*c* whereby the convolutions of the film in the shell are compacted or condensed and the film can readily pass through the opening 3*e* of the partition 3*c* during movement from the station 23 to the station 11.

The grippers 13 preferably engage the shell 1*c* close to the end wall 1*a*, namely in the region where the shell is provided with a circumferentially extending corrugation 1*c'* which reinforces the shell so as to ensure that the grippers 13 cannot bring about any appreciable deformation of the shell even though the latter is firmly held against axial movement with the pusher 19. Excessive deformation of the shell 1*c* is undesirable because this could prevent proper expulsion of the reel 4 from the shell in response to rightward movement of the pusher 19, as viewed in FIG. 2. It is clear that the end walls 1*a* and 1*b* can be held in the respective end portions of the shell 1*c* in a different way, for example, by means of rivets. Irrespective of the manner of securing the end walls 1*a* and 1*b* to the shell 1*c*, the pusher 19 is strong enough to expel the end wall 1*a* from the corresponding end portion of the shell 1*c* (while the latter is being held by the grippers 13) in each commercially available cartridge which can be manipulated in the apparatus of the present invention.

The rightward stroke of the pusher 19 under the action of the motor 119 is selected in such a way that this pusher can transfer the reel 4 from the opening station 23 all the way to the unwinding station 11, i.e., through the opening 3*e* of the partition 3*c* from one side of such partition to the other side, as viewed in FIG. 2. If desired, the pusher 19 can be rotated in a manner similar to the mode of rotating the mandrel 20. However, it normally suffices to rotate only the mandrel 20 for the purpose of winding the film onto the reel 4 in the shell 1*c* at the opening station 23 as well as during transfer of the reel from such station to the unwinding station 11. The forwardly moving pusher 19 biases the right-hand end portion of the core 4*a* against the end portion 20*a* of the mandrel 20 whereby the parts 19 and 20 ensure that the reel 4 is reliably held in proper orientation during transfer from the station 23 to the station 11.

The inclination of the duct 3 should be sufficient to ensure predictable movement of successive cartridges 1 from the inlet 3*a* toward and onto the gate 10, i.e., to the opening station 23. Some friction between the walls of the duct 3 and the descending cartridges 1 is desirable because this ensures predictable advancement of cartridges from station to station in the interior of the duct, namely onto the gate 6, thereupon onto the tilting element 7, thereupon onto the gate 9 and finally onto the gate 10. Depending on the finish of the internal surfaces of the duct 3, the inclination of such duct with reference to a horizontal plane is preferably between 45 and 80 degrees, most preferably 55 degrees. An inclination of approximately 55 degrees has been found to be acceptable irrespective of the type of cartridges which are being processed. The internal surfaces of the duct 3 can be finished to a high degree of polish and can be made of brushed stainless steel. Alternatively, or in addition to such finish, the internal surfaces of the duct 3 can be coated with one or more layers of highly wear-resistant material, such as a suitable lacquer.

The operation of the improved apparatus is as follows:

The operator inserts a fresh cartridge 1 into the inlet 3*a* of the duct 3 so that the longer end portion of the core 4*a* extends upwardly and out of the duct. The angular position of the inserted cartridge 1 is shown in FIG. 3, i.e., the mouth 1*d* abuts against the two facets 3*a'* so as to ensure that the cartridge will descend in proper orientation all the way toward and onto the lowermost gate 10. The monitoring device 5 reads the information which is encoded on the shell 1*c* of the freshly inserted cartridge 1 and generates a signal via 105 if the film in the cartridge is not compatible with the previously processed films. The operator then extracts the cartridge by inserting two fingers into the widened lateral portions of the inlet 3*a* and replaces the extracted cartridge with a different cartridge. If the film in the inserted cartridge 1 is compatible with the previously processed films, the monitoring device 5 transmits a signal to the moving means 106 which makes an attempt to extract the gate 6 from the interior of the duct 3. Such attempt is successful only if the longer end portion of the core 4*a* extends upwardly as shown in the upper portion of FIG. 1. However, if the longer end portion of the core 4*a* extends into the recess 6*a* in the upper side of the gate 6, the moving means 106 is incapable of extracting the gate and the device 106*b* generates a signal which warns the operator that the cartridge in the inlet 3*a* must be turned end for end in order to allow for an opening of the gate 6. Once the gate 6 moves to its open position, the cartridge 1 slides from the inlet 3*a* whereby the mouth 1*d* insures that the angular position of the descending cartridge remains unchanged while the cartridge advances toward and ultimately rebounds on impact against the tilting element 7. At such time, the barrier 8 is held in the extended position of FIG. 1 so that the cartridge cannot be tilted immediately but only after it has completed one or more rebounding movements on repeated impact against the tilting element 7. The delay with which the motor 8*a* extracts the barrier 8 from the interior of the duct 3 is selected in such a way that the cartridge rests on the tilting element 7 without any up-and-down movement and is free to turn in the direction of the arrow 22 shown in the upper portion of FIG. 2 as soon as the barrier 8 is retracted. The area of contact between the tilting element 7 and the respective end of the shell 1*c* and/or end wall 1*b* is small or extremely small because the tilting element 7 is preferably a round bolt of small axial length. The axial length of the tilting element 7 suffices to prevent that the cartridge 1 would slide therealong rather than be tilted in the direction of the arrow 22. For example, the tilting element 7 can be configurated to extend into the customary recess at the respective axial end of the shell 1c. Such recess is often defined by a circumferentially complete groove in the outer side of the respective end wall 1b.

As described above and as shown in FIG. 2, the configuration of the duct 3 in the region of and below the tilting element 7 is such that the tilted cartridge 1 is compelled to assume a horizontal position and to come to rest, preferably with one side of its mouth 1d, against the upper side of the gate 9. The height of the duct portion between the tilting element 7 and the gate 9 is preferably only slightly greater than the diameter of a shell 1c so as to prevent undesirable and uncontrolled rolling movements of the cartridge on its way from the tilting station into contact with the upper side of the gate 9. However, it is also possible to configurate and dimension the duct 3 in such a way that a cartridge can roll on its way from the tilting element 7 to the gate 9. All that is necessary is to ensure that the rolling movement of the cartridge is controlled in such a way that the cartridge assumes a predetermined angular position not later than when it comes to rest on the gate 9. This is desirable on the ground that improper angular positioning of the mouth 1d could prevent proper introduction of the left-hand end portion of the shell 1c at the opening station 23 of FIG. 2 between the grippers 13 of the holder 12. Thus, the angular position of the mouth 1d must be such that the mouth enters between two neighboring grippers 13 before the grippers are caused to move radially inwardly in response to energization of the electromagnet 18 and to engage the adjacent end portion of the shell 1c on the gate 10.

The gate 9 can be retracted in response to actuation of the moving means 109 which can receive a signal from the means for moving the barrier 8 so that the gate 9 is retracted with a certain delay following extraction of the barrier 8 from the interior of the duct 3. The gate 9 then allows the cartridge 1 to descend sideways toward and onto the upper side of the gate 10. In the next step, the motor 120 moves the mandrel 20 in a direction to the left, as viewed in FIG. 2, so that the left-hand end portion of the shell 1c is moved between the retracted grippers 13, and the electromagnet 18 is thereupon energized to engage the grippers with the shell 1a before the motor 119 causes the pusher 19 to perform a forward stroke and to expel the end wall 1a from the shell 1c as well as to transfer the reel 4 and the film thereon from the station 23, through the opening 3e and to the station 11.

When the expulsion of a reel 4 from the station 23 is completed, the moving means 110 is actuated to retract the gate 10 and to pivot the flap 3d to the broken line position of FIG. 1 so that the shell 1c and the wall 1b therein can descend into a collecting receptacle as soon as the grippers 13 are moved to the retracted positions of FIG. 2. The next cartridge can already rest on the gate 9 at the time when the gate 10 is retracted so that such next cartridge can descend into the opening station 23 as soon as the gate 10 returns to the extended position of FIG. 1, i.e., as soon as the empty shell 1c is discarded. This contributes to a higher output of the improved apparatus.

As mentioned above, the cartridges in the duct 3 are preferably held against any rotation about their respective axes in order to ensure that each cartridge which reaches the retractible gate 10 is held in proper angular position so that its mouth 1d does not prevent the grippers 13 from properly engaging the adjacent end portion of the shell 1c. However, and as also mentioned above, it is possible to design the duct 3 or a similar duct in such a way that each cartridge 1 can roll at least during certain stages of its movement from the inlet 3a toward the opening station 23, as long as the rolling movement is adequately controlled so as to ensure optimum angular positioning of the mouth 1d not later than upon arrival at the opening station 23. Rolling movements of cartridges in the interior of the duct 3 can be controlled by appropriate dimensioning of the corresponding portions of the duct and by appropriate finish of the internal surfaces of the duct.

An important advantage of the improved apparatus is that it can ensure predictable advancement of successive cartridges from the inlet 3a all the way to the opening station 23 in optimum orientation and with proper angular positioning of successive cartridges so that they can be properly held by the holder 12 and that the corresponding reels 4 can be expelled through the partition 3c and to the unwinding station 11. Another important advantage of the improved apparatus is that it can manipulate a large number of cartridges per unit of time as well as that it can automatically inform the attendant if the film in a particular cartridge is not compatible with the previously unwound films. An additional important advantage of the improved apparatus is that the tilting means in the intermediate portion of the duct 3 is extremely simple but highly reliable so that it does not require any inspection, maintenance and/or repair. The configuration of the corresponding portion of the duct 3 can be readily selected in such a way that the tilting of successive cartridges takes place in a predictable way without any such changes of orientation or angular position which would adversely influence the treatment of cartridges upon arrival at the opening station 23. It has been found that the improved tilting means can ensure predictable tilting of successive cartridges within the confines of a relatively simple (e.g., square or rectangular) portion of the duct. Furthermore, delayed extraction of the barrier 8 ensures that the tilting of successive cartridges begins only when such cartridges have ceased to perform any axial movements as a result of repeated rebounding upon the tilting element 7. This also contributes to greater predictability of the tilting operation.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. Apparatus for transporting a series of successive containers for exposed photographic roll films to an opening station, each container consisting essentially of a single substantially cylindrical shell having a substantially tangentially extending mouth and apertured first and second end walls in sealing engagement with the end portions of the shell, and each container confining a reel which includes a pair of spaced-apart flanges flanking a roll of convoluted exposed roll film and a core having a pair of end portions which are accessible via the respective apertured end walls, said apparatus comprising a downwardly sloping duct having an upper end portion provided with an inlet configurated to admit only containers having a single substantially cylindrical shell; means for permitting the introduction of successive containers into the inlet of said duct when the axes of the respective shells are substantially parallel to the axis of the duct and in a predetermined angular position of the mouths of the respective shells and while said first end wall is located at a level below said second end wall of the respective shell; and means for tilting successive containers in said duct ahead of said opening station.

2. The apparatus of claim 1, further comprising at least one gate provided in said duct and means for moving the gate between an operative position in said duct and a retracted position outside of said duct, said gate being located between said inlet and said opening station.

3. The apparatus of claim 1, wherein said duct defines a downwardly inclined path which makes an angle of at least 45 degrees with the horizontal.

4. The apparatus of claim 1, wherein said tilting means includes means for changing the orientation of the shells of successive containers through an angle of approximately 90 degrees.

5. The apparatus of claim 1, wherein said duct defines a path which makes with the horizontal an angle of between 50 and 80 degrees.

6. The apparatus of claim 5, wherein said angle is approximately 55 degrees.

7. The apparatus of claim 2, further comprising a housing including a substantially upright wall supporting said duct in the region of said inlet, said inlet having laterally diverging funnel-shaped portions arranged to allow for extraction of an improperly inserted container from said inlet.

8. The apparatus of claim 7, wherein said means for permitting introduction of containers includes at least one facet provided in said inlet and engageable by the mouth of a properly inserted shell.

9. The apparatus of claim 8, wherein said duct includes a substantially cylindrical internal surface surrounding said inlet along an arc of approximately 270 degrees.

10. The apparatus of claim 2 for transporting containers of the type having information encoded on the respective shells and denoting the type of film in the respective containers, further comprising means for monitoring the information on the shells of containers in said inlet and for actuating said moving means in response to detection of information denoting a selected type of film in the respective container.

11. The apparatus of claim 1, further comprising means for determining the timing of tilting of successive containers by said tilting means.

12. The apparatus of claim 1, wherein said duct has an internal surface of corrosion-resistant material.

13. The apparatus of claim 1, wherein said duct has an internal surface and a layer of wear-resistant material coating said surface.

14. The apparatus of claim 13, wherein said material is lacquer.

15. The apparatus of claim 1, wherein said duct has a lower end portion including a wall which is pivotable through an angle of at least 15 degrees.

16. The apparatus of claim 15, wherein said lower end portion of said duct further comprises a retractible gate adjacent to said pivotable wall.

17. The apparatus of claim 16, wherein said wall has an upper end portion which is remote from said gate and is pivotable about a substantially horizontal axis.

18. The apparatus of claim 1, further comprising means for guiding successive containers between said inlet and said tilting means so that the containers travel from said inlet to said tilting means in axial direction of the respective shells.

19. The apparatus of claim 1, further comprising a substantially light-tight housing accommodating said duct, and a substantially light-tight gate in said duct upstream of the opening station.

20. Apparatus for transporting to an opening station a series of successive containers for exposed photographic roll films of the type wherein a substantially cylindrical shell has a substantially tangentially extending mouth and the end portions of the shell are in sealing engagement with apertured end walls which afford access to the respective end portions of a core of a reel which is confined in the shell and has a pair of spaced-apart flanges flanking a roll of convoluted exposed roll film, the containers further being of the type wherein one end portion of the core extends beyond the respective end wall, and said apparatus comprising a downwardly sloping duct having an upper end portion provided with an inlet for admission of successive containers; means for permitting the introduction of successive containers in a predetermined angular position of the mouths of the respective shells; means for tilting successive containers in said duct ahead of the opening station; at least one gate in said duct between said inlet and said opening station, said gate being spaced apart from said inlet by a distance approximating half the axial length of a container, and said gate having a portion arranged to be engaged by the one end portion of the core of the shell of a container in said inlet; and means for moving the gate between an operative position in said duct and a retracted position outside of said duct, said moving means being arranged to move said gate out of said duct only when said portion of said gate is not engaged by the one end portion of a core.

21. The apparatus of claim 20, wherein said portion of said gate has a recess for the one end portion of the core in the shell of the container in said inlet.

22. The apparatus of claim 20, further comprising means for generating signals in response to actuation of said moving means while said portion of said gate is engaged by the one end portion of a core.

23. Apparatus for transporting to an opening station a series of successive containers for exposed photographic roll films of the type wherein a substantially cylindrical shell has a substantially tangentially extending mouth and the end portions of the shell are in sealing engagement with apertured end walls which afford access to the respective end portions of a core of a reel which is confined in the shell and has a pair of spaced-apart flanges flanking a roll of convoluted exposed roll film, said apparatus comprising a downwardly sloping duct having an upper end portion provided with an inlet for admission of successive containers; means for permitting the introduction of successive containers in a predetermined angular position of the mouths respective shells; means for tilting successive containers in said duct ahead of said opening station; at least one gate in said duct between said inlet and said opening station, said duct having a polygonal portion at a level below said gate, and said tilting means being disposed in said duct at a level at least 1.2 times the length of a container below said gate; and means for moving the gate between an operative position in said duct and a retracted position outside of said duct.

24. The apparatus of claim 23, wherein said tilting means comprises an element which is eccentric with reference to the axis of a container which descends by gravity from the level of said gate into said polygonal portion of said duct.

25. The apparatus of claim 24, wherein said element includes a substantially cylindrical member and the width of said portion of said duct at the level of said cylindrical member exceeds the axial length of a container.

26. The apparatus of claim 25, wherein said duct further comprises a second portion disposed at a level below said tilting element and laterally offset with reference to said polygonal portion by approximately half the diameter of a shell, as considered in the direction of tilting of containers under the action of said element.

27. The apparatus of claim 23 further comprising a second retractible gate provided in said duct at a level below said tilting means, the distance between the levels of said tilting means and said second gate being at least equal to the diameter of a shell.

28. The apparatus of claim 27, wherein said second gate is located in a plane which is inclined with respect to a horizontal plane.

29. Apparatus for transporting to an opening station a series of successive containers for exposed photographic roll films of the type wherein a substantially cylindrical shell has a substantially tangentially extending mouth and the end portions of the shell are in sealing engagement with apertured end walls which afford access to the respective end portions of a core of a reel wnich is confined in the shell and has a pair of spaced-apart flanges flanking a roll of convoluted exposed roll film, said apparatus comprising a downwardly sloping duct having an upper end portion provided with an inlet for admission of successive containers; means for permitting the introduction of successive containers in a predetermined angular position of the mouths of the respective shells; means for tilting successive containers in said duct ahead of the opening station; means for determining the timing of tilting of successive containers by said tilting means, said timing determining means including a barrier installed in the duct at a level above said tilting means adjacent to the path of movement of containers from said inlet against tilting means; and means for moving said barrier into and from said duct.

* * * * *